United States Patent
Codilian et al.

(10) Patent No.: US 6,865,049 B1
(45) Date of Patent: Mar. 8, 2005

(54) METHODS, SYSTEMS AND DEVICES FOR CONVERTING THE KINETIC ENERGY OF A ROTATING DISK DRIVE SPINDLE MOTOR INTO ELECTRICAL ENERGY TO CHARGE A RECHARGEABLE BATTERY

(75) Inventors: Raffi Codilian, Irvine, CA (US); Timothy A. Ferris, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 337 days.

(21) Appl. No.: 10/184,738

(22) Filed: Jun. 28, 2002

(51) Int. Cl.[7] ............................................. G11B 19/22
(52) U.S. Cl. ........................................ 360/71; 318/376
(58) Field of Search ................................ 310/105, 107, 310/108, 67 R, 68 R, 74, 93, 94, 96, 103; 318/139, 375, 376, 379; 360/71, 69, 73.03, 75; 307/23, 24, 29

(56) References Cited

U.S. PATENT DOCUMENTS

| | | | |
|---|---|---|---|
| 4,481,449 A | * 11/1984 | Rodal | 360/71 |
| 5,455,496 A | * 10/1995 | Williams et al. | 360/75 |
| 5,714,812 A | 2/1998 | Koenck et al. | 360/69 |
| 5,714,941 A | 2/1998 | Gandre | 360/69 |
| 5,838,138 A | * 11/1998 | Henty | 320/107 |
| 6,094,020 A | 7/2000 | Goretzki et al. | 318/139 |
| 6,181,502 B1 | 1/2001 | Hussein et al. | 360/73.01 |
| 6,342,984 B1 | 1/2002 | Hussein et al. | 310/74 |

FOREIGN PATENT DOCUMENTS

JP 409147470 * 6/1997

* cited by examiner

*Primary Examiner*—Sinh Tran
*Assistant Examiner*—James L Habermehl
(74) *Attorney, Agent, or Firm*—Won Tae C. Kim, Esq.; Milad G. Shara, Esq.; Alan W. Young, Esq.

(57) ABSTRACT

Methods and devices for converting the kinetic energy of the rotating spindle motor of a disk drive of a rechargeable battery operated mobile host device into electrical energy during braking of the rotating spindle motor. The converted electrical energy is conditioned and used to charge the rechargeable battery of the mobile host device.

145 Claims, 6 Drawing Sheets

METHODS, SYSTEMS AND DEVICES FOR CONVERTING THE KINETIC ENERGY OF A ROTATING DISK DRIVE SPINDLE MOTOR INTO ELECTRICAL ENERGY TO CHARGE A RECHARGEABLE BATTERY

BACKGROUND OF THE INVENTION

1. Field of the Invention

This invention relates to methods, systems and devices for extending the charge of an energy storage device of systems and devices that include a rotating spindle motor. More particularly, this invention relates to methods, systems and devices for converting the kinetic energy of a rotating disk drive spindle motor into electrical energy to charge an energy storage device such as a rechargeable battery of a host device.

2. Description of the Prior Art and Related Information

The growing popularity of portable electronic devices has coincided with significant advances in both the storage capacity of current hard disk drives as well as their miniaturization. Indeed, high capacity disk drives having a form factor of less than two inches are now widely available. The manufacturers of portable devices such as still and video cameras, portable digital assistants (PDAs), music players, telephones and mobile computing devices have taken note and have begun widely incorporating disk drives in the devices they manufacture. In portable electronic systems, the capacity of the rechargeable battery determines the length of time the user may operate his or her system in an uninterrupted fashion. The disk drive of such systems, however, consume a considerable amount of the power supplied by the rechargeable battery. Conventional approaches to lengthening the time during which such systems may operate from the battery tend to concentrate on minimizing the peak power required from the battery with little emphasis on the average running power consumption or total energy utilized.

In mobile devices, the rotating spindle motor of the hard disk drive is often braked when not actively reading or writing or when no reading or writing commands have been received for a predetermined period of time (among other reasons), to save power. The spindle driver electronics in conventional disk drives brakes (i.e., actively decreases the angular speed of) the spindle motor by shorting out the motor windings and dissipating the inertial energy stored in the spindle mechanics in the motor and the driver electronics. This inertial energy is lost as heat that is generated by the inherent resistance of the motor windings and driver circuits, as well as by frictional forces. What are needed, therefore, are ways to use this inertial energy to extend the time the host device may operate from its battery.

SUMMARY OF THE INVENTION

The present invention is a method of operating a disk drive having a spindle motor that rotates a disk. The method includes drawing electrical energy from a rechargeable battery to execute commands for reading or writing to the disk while the spindle motor is rotating; braking the rotating spindle motor; converting kinetic energy of the rotating spindle motor into electrical energy during the braking step, and charging the rechargeable battery using the electrical energy.

The method may further include regulating the electrical energy and using the regulated electrical energy to charge the rechargeable battery. The spindle motor, in operation, may produce a three phase bemf and the converting step may include selectively rectifying the generated three phase bemf and controlling current flowing from a first energy-storing device coupled to the rectified bemf to a second energy-storing device coupled to the rechargeable battery. The rectified three-phase bemf may also be filtered. The first energy-storing device may include an inductor and the second energy-storing device may include a capacitor. The regulating step may include controlling a flow of current through the first energy storing device to a reference potential or to the second energy storing device through a non-linear element between the first energy storing device and the second energy storing device. The controlling step may include selectively controlling the magnitude of the current flowing through the first energy-storing device to control the charge rate of the rechargeable battery and the rate of braking the spindle motor. The spindle motor may include windings that are selectively and cyclically shorted and open circuited during the braking step and the method further may include selectively charging a capacitor coupled to the rechargeable battery using current flowing in each of the windings. The charging step may include controlling a charging rate of the rechargeable battery. The controlling of the charging rate of the rechargeable battery may be carried out by controlling the rate of braking in the braking step. The braking step may include selecting a rate of braking of the rotating spindle motor. The rate of braking of the rotating spindle motor may be carried out by controlling the rate of charging of the rechargeable battery.

According to another embodiment thereof, the present invention is a mobile host device, comprising a rechargeable battery; a disk drive having a spindle motor that rotates a disk, the disk drive drawing electrical energy from the rechargeable battery during operation while the spindle motor may be rotating; a charging circuit coupled to the spindle motor and to the rechargeable battery, the charging circuit being configured to convert kinetic energy of the rotating spindle motor into electrical energy during braking of the spindle motor and to charge the rechargeable battery with the electrical energy.

The mobile host device may further include a regulating circuit configured to regulate the electrical energy and to charge the rechargeable battery using the regulated electrical energy. The spindle motor, in operation, may produce a three-phase bemf and the regulating circuit may be configured to selectively rectify the generated three-phase bemf and to control current flowing from a first energy-storing device coupled to the rectified bemf to a second energy storing device coupled to the rechargeable battery. The regulating circuit may be further configured to filter the selectively rectified three-phase bemf and to control current flowing from the first energy-storing device coupled to the rectified and filtered bemf to the second energy-storing device. The first energy-storing device may include an inductor and the second energy-storing device may include a capacitor. The regulating circuit further may include a nonlinear element between the first energy storing device and the second energy storage element, and control logic to selectively control a flow of current through the first energy-storing device to a reference potential or to the second energy-storing device. The nonlinear element may include a p-n junction. The control logic may be configurable to selectively control the magnitude of the current flowing through the first energy-storing device to control the charge rate of the rechargeable battery and the rate of braking of the spindle motor. The spindle motor may include windings and the charging circuit may be configured to selectively and cyclically short and open circuit the windings during the braking step and to selectively charge a capacitor coupled to the rechargeable battery using current flowing in each of the windings. The charging circuit may be configured to control the charging rate of the rechargeable battery. The charging circuit may be configured to control the charging rate of the rechargeable battery by controlling the rate of braking of the spindle motor. The charging circuit may be configured to control the rate of braking of the spindle motor. The charging circuit may be configured to control the rate of braking of the rotating spindle motor by controlling the rate of charging of the rechargeable battery.

The present invention is also a disk drive configured to be powered from a rechargeable battery, comprising a disk; a spindle motor configured to rotate the disk, and a charging circuit coupled to the spindle motor and for coupling to the rechargeable battery, the charging circuit being configured to convert kinetic energy of the rotating spindle motor into electrical energy during braking of the spindle motor and to charge the rechargeable battery with the electrical energy.

The disk drive may further include a regulating circuit configured to regulate the electrical energy and to charge the rechargeable battery using the regulated electrical energy. The spindle motor, in operation, may produce a three-phase bemf and the regulating circuit may be configured to selectively rectify the generated three-phase bemf and to control current flowing from a first energy-storing device coupled to the rectified bemf to a second-energy storing device coupled to the rechargeable battery. The regulating circuit may be further configured to filter the selectively rectified three-phase bemf and to control current flowing from the first energy device coupled to the rectified and filtered bemf to the second energy-storing device. The first energy-storing device may include an inductor and the second energy-storing device may include a capacitor. The regulating circuit further may include a nonlinear element between the first energy storing device and the second energy storage element, and control logic to selectively control the flow of current through the first energy-storing device to a reference potential or to the second energy-storing device. The non-linear element may include a p-n junction. The control logic may be configurable to selectively control the magnitude of the current flowing through the first energy-storing device to control the charge rate of the rechargeable battery and the rate of braking of the spindle motor. The spindle motor may include windings and the charging circuit may be configured to selectively and cyclically short and open circuit the windings during the braking step and to selectively charge a capacitor coupled to the rechargeable battery using current flowing in each of the windings. The charging circuit may be configured to control the charging rate of the rechargeable battery. The charging circuit may be configured to control the charging rate of the rechargeable battery by controlling the rate of braking of the spindle motor. The charging circuit may be configured to control the rate of braking of the spindle motor. The charging circuit may be configured to control the rate of braking of the rotating spindle motor by controlling the rate of charging of the rechargeable battery.

DESCRIPTION OF PREFERRED EMBODIMENTS

Figure 1:
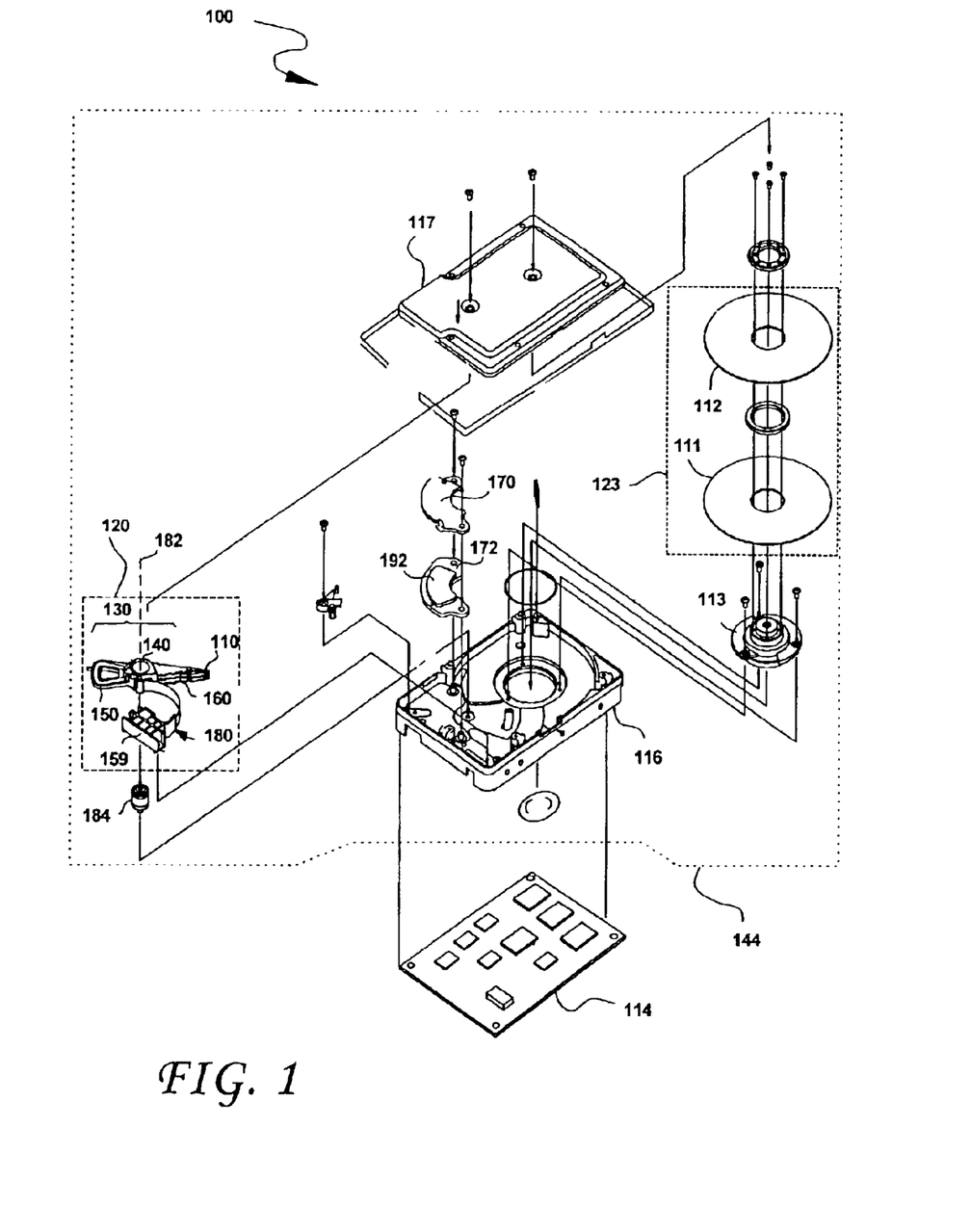
FIG. 1 is an exploded view of a disk drive incorporating an embodiment of this invention.

FIG. 1 shows the principal components of a magnetic disk drive 100 constructed in accordance with the present invention. With reference to FIG. 1, the disk drive 100 comprises a head disk assembly (HDA) 144 and a printed circuit board assembly (PCBA) 114. The HDA 144 includes a base 116 and a cover 117 attached to the base 116 that collectively house a disk stack 123 that includes a single magnetic disk or a plurality of magnetic disks (of which only a first disk 11 and a second disk 112 are shown), a spindle motor 113 attached to the base 116 for rotating the disk stack 123, a head stack assembly (HSA) 120, and a pivot bearing cartridge 184 that rotatably supports the HSA 120 on the base 116. The spindle motor 113 rotates the disk stack 123 at a constant angular velocity. The HSA 120 comprises a swing-type or rotary actuator assembly 130, at least one head gimbal assembly (HSA) 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 that, in turn, supports slider(s) (not shown) for reading and writing to the disk(s) 111, 112. The flex cable assembly 180 may include a flex circuit cable and a flex clamp 159. The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIG. 1 at reference numeral 182. The storage capacity of the HDA 144 may be increased by, for example, increasing the track density on the disks 111, 112 and/or by including additional disks in the disk stack 123 and by an HSA 120 having a vertical stack of HGAs 110 supported by multiple actuator arms 160.

The "rotary" or "swing-type" actuator assembly comprises a body portion 140 that rotates on the pivot bearing 184 cartridge between limited positions, a coil portion 150 that extends from one side of the body portion 140 to interact with one or more permanent magnets 192 mounted to back irons 170, 172 to form a voice coil motor (VCM), and an actuator arm 160 that extends from an opposite side of the body portion 140 to support the HGA 110. The VCM causes the HSA 120 to pivot about the actuator pivot axis 182 to cause the slider and the read write transducers thereof to sweep radially over the disk(s) 111, 112.

According to one aspect of the present invention, the kinetic energy of the rotating spindle motor 113 during braking or spin down may be converted to electrical energy instead of being dissipated as heat. The electrical energy may then be used to charge an energy storage device, such as a rechargeable battery 202. This process of recovering the energy stored in the rotating spindle motor 113 results in dynamic braking of the spindle motor 113.

According to an embodiment of the present invention, during normal use of the disk drive (such as when the disk drive is executing read or write commands or when it is idle), electrical energy is drawn from the rechargeable battery 202. The kinetic energy of a rotating spindle motor 113 is proportional to the square of its angular speed and to its inertia. To reduce the power consumption of the device, the disk drive may be spun down or braked when it is no longer drawing electrical energy from the rechargeable battery 202, or after a predetermined period of time (for example) during which no read or write commands have been received by the host device 200 of FIG. 2, for example. The present invention envisages recovering a portion of the kinetic energy present in the rotating spindle during braking and converting the recovered kinetic energy to electrical energy that may be used, after proper regulating thereof, to charge the rechargeable battery 202. This regulating of the converted electrical energy may include rectifying, filtering and boosting the voltage of the converted electrical energy, and using this regulated signal to charge the rechargeable battery 202. The process of converting the kinetic energy of the rotating spindle motor 113, however, should preferably stop prior to the disk drive beginning to draw electrical energy from the rechargeable battery 202 incident to normal use thereof; that is, prior to the disk drive executing read and write commands and activities incident thereto.

The spindle motor 113, when in rotation, produces a three phase back electromotive force (hereafter, emf). It is these three phases that are used to produce the electrical energy that is used, according to the present invention, to charge the rechargeable battery 202. However, before such AC three phase bemf may be used to charge the rechargeable battery 202, it must be rectified in a rectifier (referenced at D1–D6 in FIGS. 2, 3 and 5, filtered by filter/capacitor 304, and regulated in a power management unit 306 and transferred to the rechargeable battery 202 without hindering the disk drive's operation. The foregoing elements (the disk drive 100, the rectifier D1–D6, the filter 304, the power management unit 306 may be incorporated into a mobile host device 200 whose constituent parts may also draw electrical energy from the rechargeable battery 202. Such constituent parts may include, for example, a processor 212, memory 214, Input/Output devices 216 (display, speakers, etc.) and others, collectively referenced by numeral 218. As also suggested by FIG. 2, the structures designated by references D1–D6, 304 and 306 may be incorporated within the disk drive 100 or may be integrated in a structure that is separate therefrom.

Figure 3:
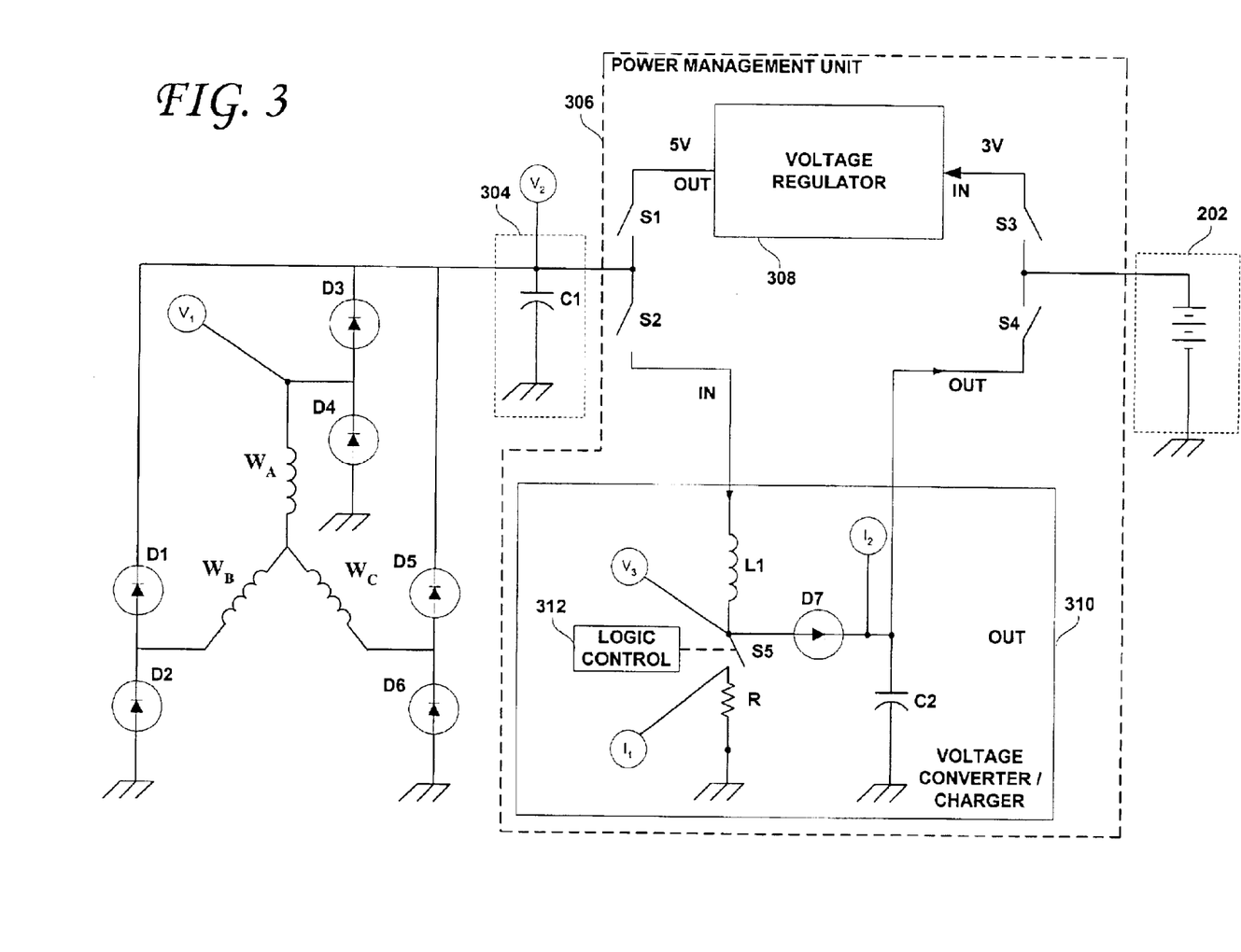
FIG. 3 shows a regulating circuit according to an embodiment of the present invention.
Figure 4:
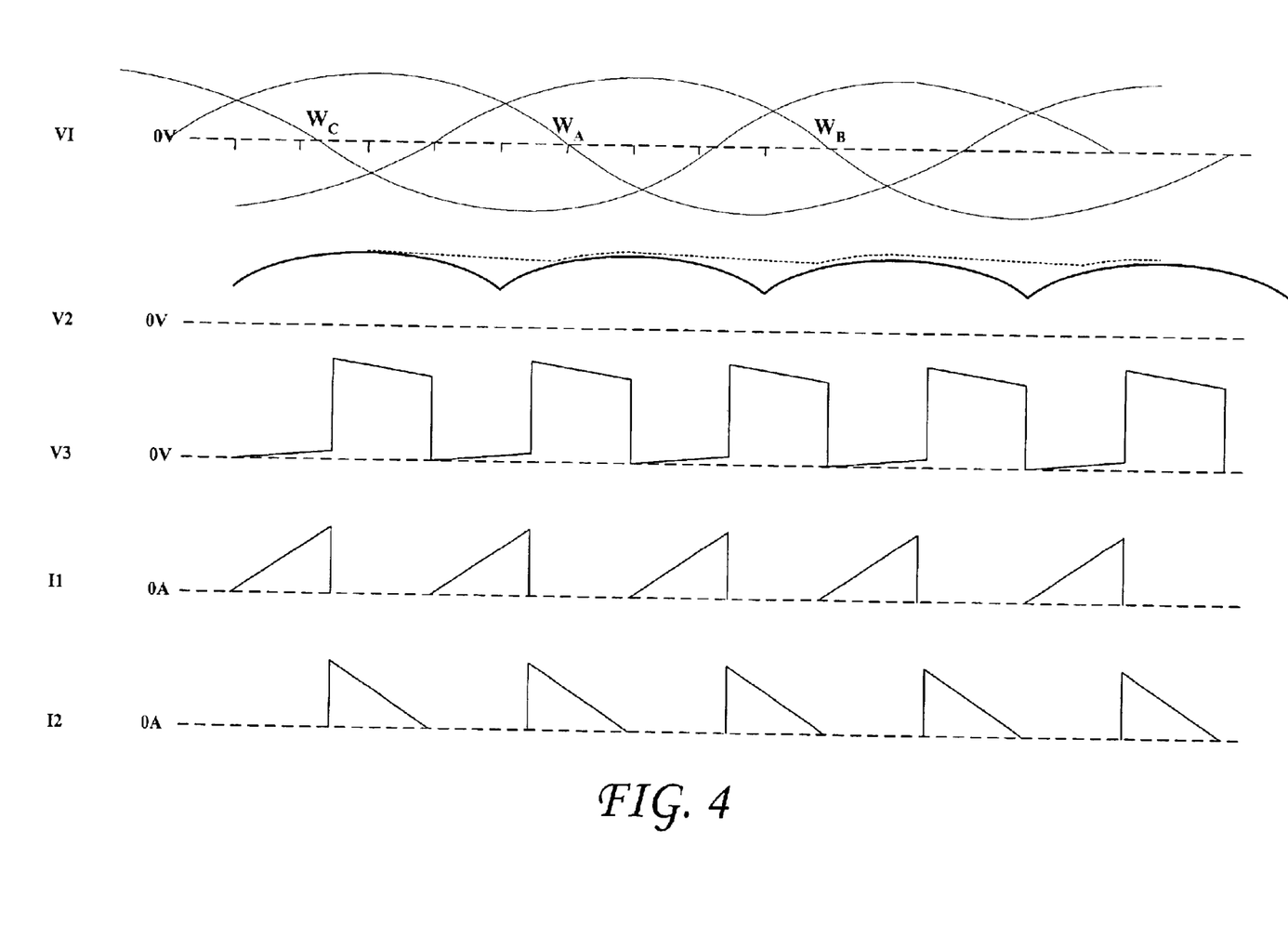
FIG. 4 shows waveforms at selected junctures in the schematic of FIG. 3.

FIG. 3 shows a schematic of a circuit to carry out the conditioning of the electrical energy converted from the kinetic energy of the rotating spindle motor 113 during braking of the rotating spindle motor 113 and the charging of the rechargeable battery 202 with the electrical energy. FIG. 4 shows representative waveforms taken at various points in the circuit of FIG. 3. Considering now FIGS. 3 and 4 collectively, the three phase (each offset by 120°) bemf voltages $W_A$, $W_B$ and $W_C$ (graphically shown at V1 in FIG. 4) are coupled to the full-wave rectifier comprised by the p-n junctions (e.g., diodes or diode-connected field effect transistors) D1–D6. As shown, the $W_B$ bemf is coupled to the anode of D1 and to the cathode of D2. Similarly, the WA bemf is coupled to the anode of D3 and to the cathode of D4. Likewise, the $W_C$ bemf is coupled to the anode of D5 and to the cathode of D5. The anodes of D2, D4 and D6 may be connected to a reference potential such as ground. The cathodes of D1, D3 and D5 are connected together. In this manner, windings $W_A$, $W_B$ and $W_C$ and the diodes D1–D6 form a full-wave rectifier that produces the rectified voltage shown at V2 in both FIGS. 3 and 4. In FIG. 4, the solid waveform at V2 is the unfiltered full-wave rectified signal. The half-wave rectified signal may then be filtered by filter 304, to remove high frequency components therefrom. For example, the filter 304 may include one or more capacitors connected between the cathodes of D1, D3 and D5 and the reference voltage (e.g., ground). The full-wave rectified and filtered signal is shown in dashed lines at V2 in FIG. 4, and is a substantially constant voltage.

As shown, the rectified and filtered voltage V2 may be coupled to a power management unit 306, whose function may include converting and regulating the power from the rechargeable battery 202 (e.g., boost the battery voltage to a level usable by the disk drive) and to convert the rectified and filtered voltage V2 to a level that is effective to charge the rechargeable battery 202. Toward that end, the power management unit 306 may include a conventional voltage regulator 308 voltage regulator 308 and a boost converter charger 310 according to the present invention. The power management unit 306 may include a switch S1 between the V2 node and its output and another switch S3 between the rechargeable battery 202 and its input. Similarly, a switch S2 is present between node V2 and the input to the voltage converter/charger 310 and another switch S4 between the output of 310 and the rechargeable battery 202.

During normal operation of the disk drive, power may be drawn from the rechargeable battery 202 and switches S3 and S1 are closed and switches S4 and S2 are in the open position. In this configuration, power from the rechargeable battery 202 is regulated by voltage regulator 308 (from 3V DC to 5V DC, for example) and supplied to the spindle motor 113 and/or other circuits within the disk drive 100. However, when no read or write commands have been received from the host after a predetermined period of time (and/or based on some other criteria), while the spindle motor 113 is still rotating, switches S3 and S1 are opened and S2 and S4 are closed, so that the filtered and rectified voltage at V2 may be converted and used to charge the rechargeable battery 202, thereby recuperating some of the kinetic energy of the rotating spindle motor 113 to charge the rechargeable battery 202.

An embodiment of the boost converter charger is shown in the dashed box referenced at numeral 310 in FIG. 3. The voltage converter/charger 310, according to the present invention, controls current flowing from a first energy storing device coupled to the rectified and filtered bemf of the spindle motor 113 to a second energy storing device that is coupled to the rechargeable battery 202. As shown therein, the IN terminal of voltage converter/charger 310 may be coupled to the $V_2$ node. The $V_2$ voltage is stored in the first energy-storing device, represented in FIG. 3 by inductor L1. The inductor L1 charges at a rate that is proportional to the rate of change of the current flowing therethrough ($V_{L1}=L_1$ di/dt). The other terminal of the first energy-storing device is coupled to switch S5, which switch is controlled by control logic 312. Switch S5 shunts the current though the first switch to the reference voltage (e.g., ground) through a voltage sensor, represented in FIG. 3 by a small sense resistor R coupled between the switch S5 and the reference voltage. The current through the sense resistor R is shown in FIG. 4 at $I_1$. The IR drop across the sense resistor R may be used by the control logic 312 to determine when to open and close the switch S5. As shown, the current at $I_1$ is zero until the switch S5 is closed, whereupon the current $I_1$ ramps up (an idealized linear ramp is shown in FIG. 3) until switch S5 opens, whereupon the current $I_1$ that was flowing though the first energy storing device flows through a nonlinear element such as a p-n junction. The p-n junction is shown in FIG. 3 as diode D7. Diode D7 is now forward biased, and the second energy storing device (capacitor C2 in FIG. 3) charges up to voltage $V_3$ (minus the voltage drop across diode D7. $V_3$, as shown in FIG. 4 varies from zero to the battery voltage plus one diode voltage drop. The current through the first energy storing device L1 is then switched to the diode D7 and charges the second energy storing device C2, which charges the rechargeable battery 202. $I_2$ is shown in FIG. 4 (again, idealized waveforms are shown), and charges up when switch S5 opens. As the current through an inductor cannot change instantaneously, the current that was flowing through the sense resistor R now flows through diode D7 and operates to charge the second energy storing device C2. The second energy-storing device is coupled between the reference voltage (e.g., ground) and the positive terminal of the rechargeable battery 202. In this manner, dynamic braking is carried out, making the spindle motor 113, in effect, give up some of the kinetic energy it stores by virtue of its rotation in the form of electrical energy that is conditioned and used to charge the rechargeable battery 202.

The present boost converter charger may be configured to selectively control the magnitude of the current flowing through the first energy storing device to control the charge rate of the rechargeable battery 202 and the associated rate of braking of the rotating spindle motor 113. Indeed, switch S5 may be controlled by the logic control 312 to remain closed for a longer period of time, thereby allowing $I_1$ to ramp up to a greater magnitude than would be the case if S5 were closed sooner. For applications in which acoustical noise is a consideration and slower charging times are acceptable, $I_1$ may be controlled so that it remains relatively small. The spindle motor 113, in that case, will not be spun down or braked quite as aggressively as might be the case if $I_1$ were allowed to ramp up to a greater magnitude by logic control 312.

Figure 2:
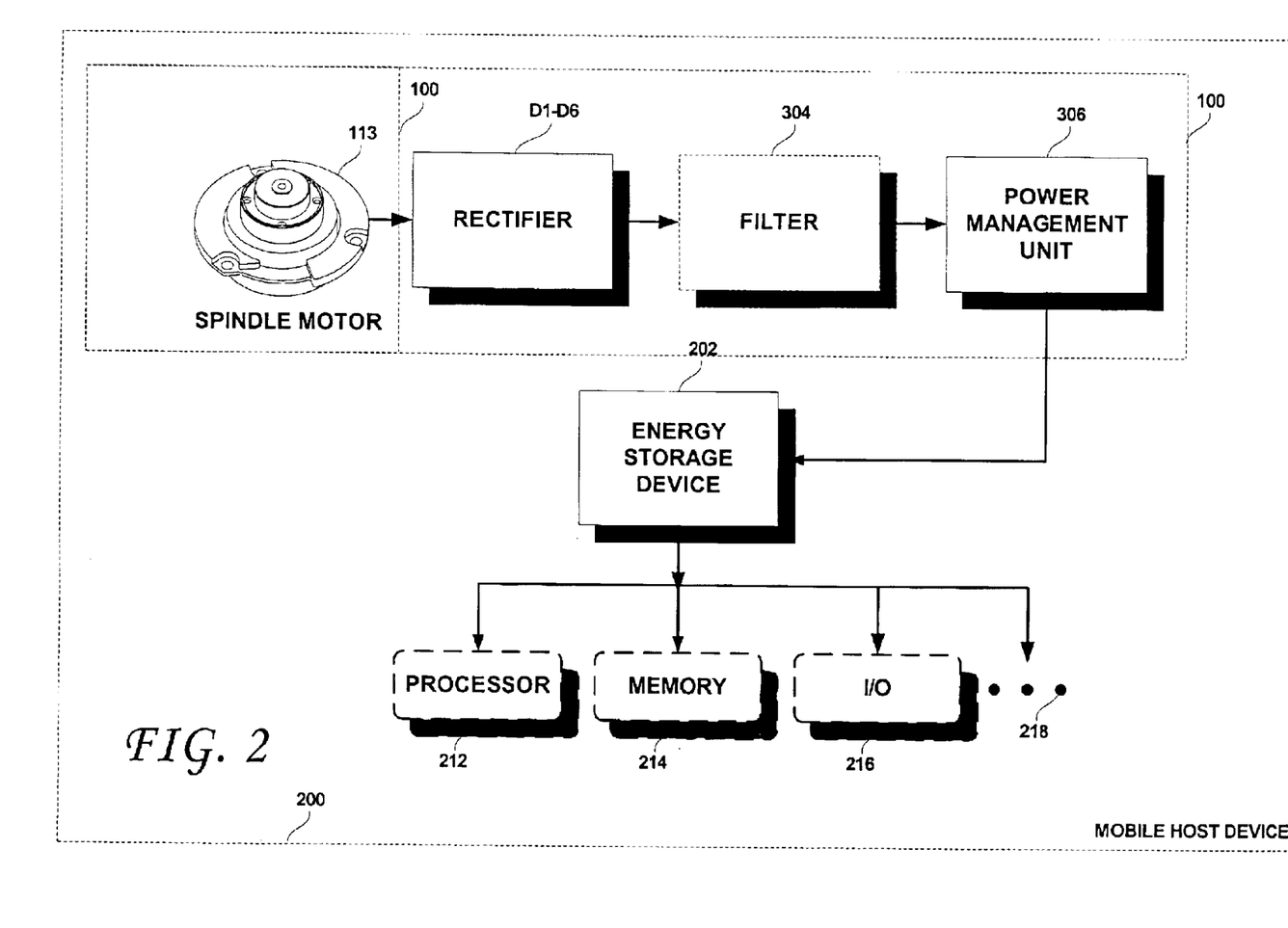
FIG. 2 is a block diagram illustrating aspects of the present invention.
Figure 5:
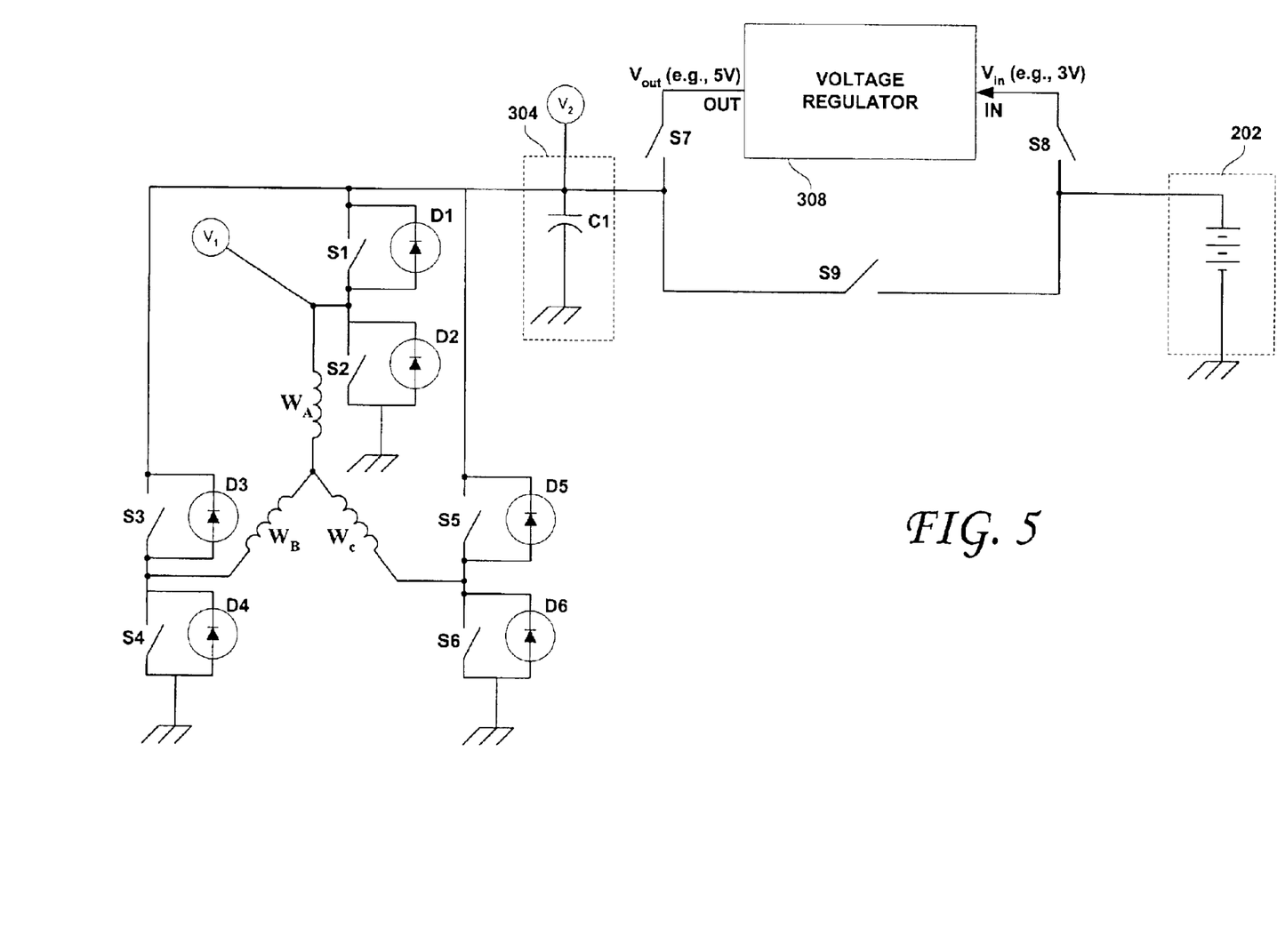
FIG. 5 shows a spindle flyback battery charger, according to an embodiment of the present invention.
Figure 6:
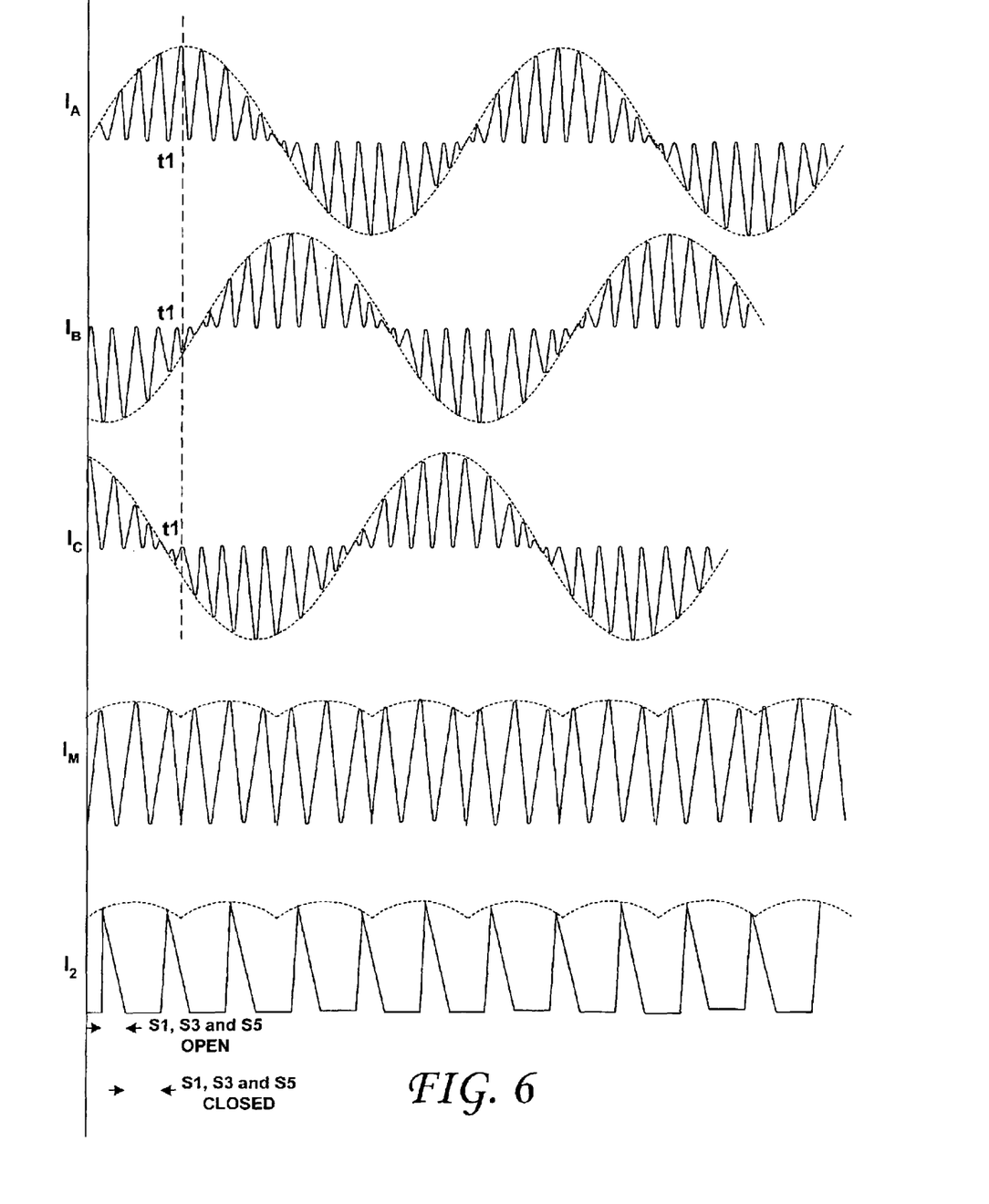
FIG. 6 shows a number of waveforms that describe aspects of the operation of the flyback battery charger of FIG. 5.

FIG. 5 shows a schematic of a spindle flyback battery charger, according to an embodiment of the present invention. FIG. 6 shows a number of waveforms that describe aspects of the schematic of FIG. 5. Considering now FIGS. 5 and 6 collectively, FIG. 5 shows the motor windings $W_A$, $W_B$, and $W_C$ and a rectifier including diodes (p-n junctions or diode-connected transistors) D1–D6, all arranged in the same manner as shown in FIG. 2. In this embodiment, a controllable switch (shown at S1–S6) is connected across each of the diodes D1–D6. The controllable switches in FIG. 5 may advantageously be or include Field Effect transistors (FETs). Controllable switch S1 is connected across D1, controllable switch S2 across D2 and so forth. In the spindle flyback battery charger of this embodiment, the boost converter/charger 310 has been replaced by controllable switch S9. During normal operation of the drive (i.e., when the drive is drawing electrical energy from the rechargeable battery 202), switches S8 and S7 are closed and S9 is open and the capacitor C1 charges to $V_{out}$, which is the voltage output from the voltage regulator 308 voltage regulator 308 connected between S7 and S8. Switch S9 remains open during normal operation of the drive. When S7 and S8 are closed and S9 is open, the rechargeable battery 202 supplies the spindle motor 113 with a regulated voltage $V_{out}$, via the voltage regulator 308 to enable the spindle motor 113 to rotate. Specifically, the switches S1–S6 are sequenced by the spindle motor controller to sequentially supply voltage to the motor windings $W_A$, $W_B$ and $W_C$ to drive the spindle motor 113 in rotation.

To enable spin-down (braking) of the spindle motor 113 (when the disk drive is not in use, for example) and charging of the energy storage device 202 (e.g., a rechargeable battery), switches S7 and S8 are opened and switch S9 is closed. Switches S2, S4 and S6 are opened, thereby bringing the diodes D2, D4 and D6 into the circuit. Switches S1, S3 and S5 are then cyclically opened and closed. The duty cycle and the frequency of the opening and closing of switches S1, S3 and S5 control, according to the present invention, the rate of spin down/braking of the spindle motor 113 as well as the rate of charge of the rechargeable battery 202, as described in detail below. According to the present invention, the rate of spin down/braking of the spindle motor 113 is inversely proportional to the charging rate of the rechargeable battery 202. That is, the greater the rate of spin down/braking of the spindle motor 113, the lesser the rate of charge of the rechargeable battery 202, and vice-versa. As shown, when S1, S3 and S5 are closed, the motor windings $W_A$, $W_B$ and $W_C$ are shorted to one another and the diodes D1, D3 and D5 are shorted and current flow is induced due to the bemf in the windings $W_A$, $W_B$ and $W_C$. For example, current may flow through windings $W_B$ and $W_C$, and out through winding $W_A$, as shown at $I_A$ in FIG. 6. The other two sinusoidal current phases $I_B$ and $I_C$ are similarly generated and are shown at $I_B$ and $I_C$ in FIG. 6. The $I_M$ waveform of FIG. 6 in dashed lines is the rectified motor current from they spindle motor 113 when the windings $W_A$, $W_B$ and $W_C$ are shorted, whereas the higher frequency sinusoidal current shown in the waveform $I_M$ in solid lines represents the sum of the (one or two) positive going winding currents $I_A$, $I_B$ and $I_C$ through windings $W_A$, $W_B$ and $W_C$, respectively. As shown in FIG. 6, the current 12, when switches S1, S3 and S5 are closed, is substantially zero. The solid waveforms of $I_A$, $I_B$ and $I_C$, represent the current through the windings during fly back, whereas the dashed lines represent the sinusoidal envelope of these winding currents. When S1, S3 and S5 are opened by the motor controller, the currents $I_A$, $I_B$, and $I_C$, are interrupted, and the voltage across diodes D1, D3 and D5 rises until the diodes D1, D3 and D5 are forward biased in turn. The capacitor C1 charges until the voltage across C1 exceeds that of that of the rechargeable battery 202. Current 12 then flows into the rechargeable battery 202 and charges it. For example, if the three-phase current during the fly back charge mode shown in FIG. 6 is such that $I_A$ is positive and $I_B$ and $I_C$ are negative (such as at time t1, for example), D4 and D6 conduct through windings $W_B$ and $W_C$, D1 is also forward biased and conducts, which charges C1 and the current 12 flows to the rechargeable battery 202.

As noted above, the duty cycle and frequency of opening and closing switches S1, S3 and S5 determines the rate of charge of the rechargeable battery 202. If, for example, S1, S3 and S5 were to be closed all of the time, the maximum rate of braking would be achieved, but the rechargeable battery 202 would not be charged. On the other hand, should S1, S3 and S5 be left open all of the time, there would also be no charging of the rechargeable battery 202, but no braking either. That is, the spindle motor 113 would decelerate only as a result of frictional forces, and not due to any shorting of the windings to one another. The duty cycle of the opening and closing of S1, S3 and S5, therefore, should be optimized as desired to trade deceleration of the spindle motor for charging of the rechargeable battery 202, so that the rate of braking of the spindle motor 113 is acceptable while charging the rechargeable battery 202 at an acceptable and useful rate.

Similar results may be obtained by opening switches S1, S3 and S5 and cyclically opening and closing switches S2, S4 and S6. In that case, the duty cycle of opening and closing switches S2, S4 and S6 determines the rate of charge of the rechargeable battery 202.

Advantageously, the present invention enables the battery of a host device to be recharged from the kinetic energy inherent in a rotating spindle motor.

We claim:

1. Method of operating a disk drive having a spindle motor that rotates a disk comprising:
   drawing electrical energy from a rechargeable battery to execute command for reading or writing to the disk while the spindle motor is rotating, the spindle motor, in operation, generating a three phase bemf;
   braking the rotating spindle motor;
   converting kinetic energy of the rotating spindle motor into electrical energy during the braking step;
   regulating the electrical energy by selectively rectifying the generated three phase bemf and by controlling current flowing from a first energy storing device coupled to the rectified bemf to a second energy-storing device coupled to the rechargeable battery, and charging the rechargeable battery using the regulated electrical energy.

2. The method of claim 1, further including filtering the rectified three-phase bemf.

3. The method of claim 1, wherein the first energy-storing device includes an inductor.

4. The method of claim 1, wherein the second energy-storing device includes a capacitor.

5. The method of claim 1, wherein regulating step includes controlling a flow of current through the first energy storing device to a reference potential or to the second energy storing device through a nonlinear element between the first energy storing device and the second energy storing device.

6. The method of claim 1, wherein the controlling step includes selectively controlling a magnitude of the current flowing through the first energy storing device to control a charge rate of the rechargeable battery and a rate of braking the spindle motor.

7. The method of claim 1, wherein the spindle motor includes windings that are selectively and cyclically shorted and open circuited during the braking step, wherein the second energy-storing device includes a capacitor and wherein the method further includes selectively charging the capacitor coupled to the rechargeable battery using current flowing in each of the windings.

8. The method of claim 1, wherein the charging step includes controlling a charging rate of the rechargeable battery.

9. The method of claim 8, wherein controlling the charging rate of the rechargeable battery is carried out by controlling a rate of braking in the braking step.

10. The method of claim 1, wherein the braking step includes selecting a rate of bring of the rotating spindle motor.

11. The method of claim 10, wherein the rate of braking of the rotating spindle motor is carried out by controlling a rate of charging of the rechargeable battery.

12. A mobile host device, comprising:
    a rechargeable battery;
    a disk drive having a spindle motor that rotates a disk, the disk drive drawing electrical energy from the rechargeable battery during operation while the spindle motor is rotating, the spindle motor, in operation, generating a three phase bemf;
    a regulating and charging circuit coupled to the spindle motor and to the rechargeable battery, the regulating and charging circuit being configured to convert kinetic energy of the rotating spindle motor into electrical energy during braking of the spindle motor, and to regulate the electrical energy by selectively rectifying the generated three phase bemf and by controlling current flowing from a first energy storing device coupled to the rectified bemf to a second energy storing device coupled to the rechargeable battery, the regulating and charging circuit being further configured to charge the rechargeable battery with the regulated electrical energy.

13. The device of claim 12, wherein the regulating circuit is further configured to filter the selectively rectified three-phase bemf and to control current flowing from the first energy-storing device coupled to the rectified and filtered bemf to the second energy-storing device.

14. The device of claim 12, wherein the first energy-storing device included an inductor.

15. The device of claim 12, wherein the second energy-storing device includes a capacitor.

16. The device of claim 12, wherein the regulating circuit fixer includes:
    a nonlinear element between the first energy storing device and the second energy storage element, and
    control logic to selectively control a flow of current through the first energy-storing device to a reference potential or to the second energy-storing device.

17. The device of claim 16, wherein the nonlinear element includes a p-n junction.

18. The device of claim 16, wherein the control logic is confinable to selectively control a magnitude of the current flowing through the first energy storing device to control a charge rate of the rechargeable battery and a rate of braking of the spindle motor.

19. The device of claim 12, wherein the second energy-storing device includes a capacitor and wherein the spindle motor includes windings and the charging circuit is configured to selectively and cyclically short and open circuit the windings during braking and to selectively charge the capacitor coupled to the rechargeable battery using current flowing in each of the windings.

20. The device of claim 12, wherein the charging circuit is configured to control a charging rate of the rechargeable battery.

21. The device of claim 20, wherein the charging circuit is configured to control the charging rate of the rechargeable battery by controlling a rate of braking of the spindle motor.

22. The device of claim 12, wherein the charging circuit is configured to control a rate of braking of the spindle motor.

23. The device of claim 22, wherein the charging circuit is configured to control the rate of braking of the rotating spindle motor by controlling a rate of charging of the rechargeable battery.

24. A disk drive configured to be powered from a rechargeable battery, comprising:
    a disk;
    a spindle motor configured to rotate the disk and to generate, in operation, a three phase bemf, and
    a regulating and charging circuit coupled to the spindle motor and for coupling to the rechargeable battery, the regulating and charging circuit being configured to convert kinetic energy of the rotating spindle motor into electrical energy during braking of the spindle motor, and to regulate the electrical energy by selectively rectifying the generated three phase bemf and by controlling current flowing from a first energy storing device coupled to the rectified bemf to a second energy storing device coupled to the rechargeable battery, the regulating and charging circuit being further configured to charge the rechargeable battery with the regulated electrical energy.

25. The disk drive of claim 24, wherein the regulating circuit is further configured to filter the selectively rectified three-phase bemf and to control current flowing from the first energy device coupled to the rectified and filtered bemf to the second energy-storing device.

26. The disk drive of claim 24, wherein the first energy-storing device includes an inductor.

27. The disk drive of claim 24, wherein the second energy-storing device includes a capacitor.

28. The disk drive of claim 24, wherein the regulating circuit further includes:
  a nonlinear element between the first energy storing device and the second energy storage element, and
  control logic to selectively control a flow of current through the first energy-storing device to a reference potential or to the second energy-stoning device.

29. The disk drive of claim 28, wherein the nonlinear element includes a p-n junction.

30. The disk drive of claim 28, wherein the control logic is configurable to selectively control a magnitude of the current flowing through the first energy storing device to control a charge rate of the rechargeable battery and a rate of braking of the spindle motor.

31. The disk drive of claim 24, wherein the second energy-storing device includes a capacitor and wherein the spindle motor includes windings and the charging circuit is configured to selectively and cyclically short and open circuit the windings during the braking step and to selectively charge the capacitor coupled to the rechargeable battery using current flowing in each of the windings.

32. The disk drive of claim 24, wherein the charging circuit is configured to control a charging rate of the rechargeable battery.

33. The disk drive of claim 24, wherein the charging circuit is configured to control the charging rate of the rechargeable battery by controlling a rate of braking of the spindle motor.

34. The disk drive of claim 24, wherein the charging circuit is configured to control a rate of braking of the spindle motor.

35. The disk drive of claim 34, wherein the charging circuit is configured to control the rate of braking of the rotating spindle motor by controlling a rate of charging of the rechargeable battery.

36. Method of operating a disk drive having a spindle motor that rotates a disk comprising:
  drawing electrical energy from a rechargeable battery to execute commands for reading or writing to the disk while the spindle motor is rotating;
  braking the rotating spindle motor by selectively and cyclically shorting and open circuiting windings of the spindle motor;
  converting kinetic energy of the rotating spindle motor into electrical energy during the braking step, and
  charging the rechargeable battery using the electrical energy by selectively charging a capacitor coupled to the reachable battery using current flowing in each of the windings.

37. The method of claim 36, further including regulating the electrical energy and using the regulated electrical energy to charge the rechargeable battery.

38. The method of claim 37, wherein the spindle motor, in operation, produces a three phase bemf and wherein the converting step includes:
  selectively rectifying the generated three phase bemf and
  controlling current flowing from a first energy-storing device coupled to the rectified bemf to the capacitor coupled to the rechargeable battery.

39. The method of claim 38, further including filtering the rectified three-phase bemf.

40. The method of claim 38, wherein the first energy-storing device includes an inductor.

41. The method of claim 38, wherein the controlling step includes selectively controlling a magnitude of the current flowing through the first energy storing device to control a charge rat of the rechargeable battery and a rate of braking the spindle motor.

42. The method of claim 37, wherein regulating step includes controlling a flow of current through the first energy storing device to a reference potential or to the capacitor through a nonlinear element between the first energy storing device and the capacitor.

43. The method of claim 36, wherein the charging step includes controlling a charging rate of the rechargeable battery.

44. The method of claim 43, wherein controlling the charging rate of the rechargeable battery is carried out by controlling a rate of braking in the braking step.

45. The method of claim 36, wherein the braking step includes selecting a rate of braking of the rotating spindle motor.

46. The method of claim 45, wherein the rate of braking of the rotating spindle motor is carried out by controlling a rate of charging of the rechargeable battery.

47. A mobile host device, comprising:
  a rechargeable battery;
  a disk drive having a spindle motor that rotates a disk, the spindle motor including windings, the disk drive drawing electrical energy from the rechargeable battery during operation while the spindle motor is rotating;
  a charging circuit coupled to the spindle motor and to the rechargeable battery the charging circuit being configured to convert kinetic energy of the rotating spindle motor into electrical energy during braking of the spindle motor by selectively and cyclically shorting and open circuiting the windings and to selectively charge a capacitor coupled to the rechargeable battery using current flowing in each of the windings.

48. The device of claim 47, further including a regulating circuit configured to regulate the electrical energy and to charge the rechargeable battery using the regulated electrical energy.

49. The device of claim 48, wherein the spindle motor, in operation, produces a three phase bemf and wherein the regulating circuit is configured to selectively rectify the generated three phase bemf and to control current flowing from a first energy storing device coupled to the rectified bemf to the capacitor.

50. The device of claim 49, wherein the regulating circuit is further configured to filter the selectively rectified three-phase bemf and to control current flowing from the first energy-storing device coupled to the rectified and filtered bemf to the capacitor.

51. The device of claim 49, wherein the first energy-storing device includes an inductor.

52. The device of claim 49, wherein the regulating circuit further includes:

a nonlinear element between the first energy storing device and the capacitor, and control logic to selectively control a flow of current through the fast energy-storing device to a reference potential or to the capacitor.

53. The device of claim 52, wherein the nonlinear element includes a in junction.

54. The device of claim 52, wherein the control logic is configurable to selectively control a magnitude of the current flowing through the first energy storing device to control a charge rate of the rechargeable battery and a rate of braking of the spindle motor.

55. The device of claim 47, wherein the charging circuit is configured to control a charging rate of the rechargeable battery.

56. The device of claim 55, wherein the charging circuit is configured to control the charging rate of the rechargeable battery by controlling a rate of braking of the spindle motor.

57. The device of claim 47, wherein the charging circuit is configured to control a rate of braking of the spindle motor.

58. The device of claim 57, wherein the charging circuit is configured to control the rate of braking of the rotating spindle motor by controlling a rate of charging of the rechargeable battery.

59. A disk drive configured to be powered from a rechargeable battery, comprising:
    a disk;
        a spindle motor configured to rotate the disk, the spindle motor including windings, and
        a charging circuit coupled to the spindle motor and for coupling to the rechargeable battery, the charging circuit being configured to convert kinetic energy of the rotating spindle motor into electrical energy during braking of the spindle motor by selectively and cyclically shorting and open circuiting the windings and to selectively charge a capacitor coupled to the rechargeable battery using current flowing in each of the windings.

60. The disk drive of claim 59, further including a regulating circuit configured to regulate the electrical energy and to charge the rechargeable battery using the regulated electrical energy.

61. The disk drive of claim 60, wherein the spindle motor, in operation, produces a three phase bemf and wherein the regulating circuit is configured to selectively rectify the generated three phase bemf and to control current flowing from a first energy storing device coupled to the rectified bemf to the capacitor.

62. The disk dive of claim 61, wherein the regulating circuit is further configured to filter the selectively rectified three-phase bemf and to control current flowing from the first energy device coupled to the rectified and filtered bemf to the capacitor.

63. The disk drive of claim 61, wherein the first energy-storing device includes an inductor.

64. The disk drive of claim 61, wherein the regulating circuit further includes:
    a nonlinear element between the first energy storing device and the capacitor, and
    control logic to selectively control a flow of current through the first energy-storing device to a reference potential or to the capacitor.

65. The disk drive of claim 64, wherein the nonlinear element includes a p-n junction.

66. The disk drive of claim 64, wherein the control logic is configurable to selectively control a magnitude of the current flowing through the first energy storing device to control a charge rate of the rechargeable battery and a rate of braking of the spindle motor.

67. The disk drive of claim 59, wherein the charging circuit is configured to control a charging rate of the rechargeable battery.

68. The disk drive of claim 67, wherein the charging circuit is configured to control the charging rate of the rechargeable battery by controlling a rate of braking of the spindle motor.

69. The disk drive of claim 65, wherein the charging circuit is configured to control a rate of braking of the spindle motor.

70. The disk drive of claim 69, wherein the charging circuit is configured to control the rate of braking of the rotating spindle motor by controlling a rate of charging of the rechargeable battery.

71. Method of operating a disk drive having a spindle motor that rotates a disk, comprising:
    drawing electrical energy from a rechargeable battery to execute commands for reading or writing to the disk while the spindle motor is rotating;
    braking the rotating spindle motor;
    converting kinetic energy of the rotating spindle motor into electrical energy during the braking step, and
    charging the rechargeable battery using the electrical energy and controlling a rate at which the rechargeable battery charges.

72. The method of claim 71, further including regulating the electrical energy and using the regulated electrical energy to charge the rechargeable battery.

73. The method of claim 72, wherein the spindle motor, in operation, produces a three phase bemf and wherein the converting step includes:
    selectively rectifying the generated three phase bemf and
    controlling current flowing from a first energy-storing device coupled to the rectified bemf to a second energy-storing device coupled to the rechargeable battery.

74. The method of claim 73, further including filtering the rectified three-phase bemf.

75. The method of claim 73, wherein the first energy-storing device includes an inductor.

76. The method of claim 73, wherein the second energy-storing device includes a capacitor.

77. The method of claim 73, wherein regulating step includes controlling a flow of current through the first energy storing device to a reference potential or to the second energy storing device through a nonlinear element between the first energy storing device and the second energy storing device.

78. The method of claim 73, wherein the controlling step includes selectively controlling a magnitude of the current flowing through the first energy storing device to control a charge rate of the rechargeable battery and a rate of braking the spindle motor.

79. The method of claim 71, wherein the spindle motor includes windings that are selectively and cyclically shorted and open circuited during the braking step and wherein the method further includes selectively charging a capacitor coupled to the rechargeable battery using current flowing in each of the windings.

80. The method of claim 79, wherein controlling the rate at which the rechargeable battery charges is carried out by controlling a rate of braking in the braking step.

81. The method of claim 71, wherein the braking step includes selecting a rate of braking of the rotating spindle motor.

82. The method of claim 81, wherein the rate of braking of the rotating spindle motor is carried out by the controlling of the rate at which the rechargeable battery charges.

83. A mobile host device, comprising:
   a rechargeable battery;
   a disk drive having a spindle motor that rotates a disk, the disk drive drawing electrical energy from the rechargeable battery during operation while the spindle motor is rotating;
   a charging circuit coupled to the spindle motor and to the rechargeable battery, the charging circuit being configured to convert kinetic energy of the rotating spindle motor into electrical energy during bung of the spindle motor and to charge the rechargeable battery with the electrical energy, the charging circuit being further configured to control a rate at which the rechargeable battery charges.

84. The device of claim 83, further including a regulating circuit configured to regulate the electrical energy and to charge the rechargeable battery using the regulated electrical energy.

85. The device of claim 84, wherein the spindle motor, in operation, produces a three phase bemf and wherein the regulating circuit is configured to selectively rectify the generated three phase bemf and to control current flowing from a first energy storing device coupled to the rectified benefit to a second energy storing device coupled to the rechargeable battery.

86. The device of claim 85, wherein the regulate circuit is further configured to filter the selectively rectified three-phase bemf and to control current flowing from the first energy-storing device coupled to the rectified and filtered bemf to the second energy-storing device.

87. The device of claim 85, wherein the first energy-storing device includes an inductor.

88. The device of claim 85, wherein the second energy-storing device includes a capacitor.

89. The device of claim 85, wherein the regulating circuit further includes:
   a nonlinear element between the first energy storing device and the second energy storage element, and
   control logic to selectively control a flow of current through the first energy-storing device to a reference potential or to the second energy-storing device.

90. The device of claim 89, wherein the nonlinear element includes a p-n junction.

91. The device of claim 89, wherein the control logic is configurable to selectively control a magnitude of the current flowing through the first energy storing device to control the rate at which the rechargeable battery charges and a rate of braking of the spindle motor.

92. The device of claim 83, wherein the spindle motor includes windings and the charging circuit is configured to selectively and cyclically short and open circuit the windings during the braking step and to selectively charge a capacitor coupled to the rechargeable battery using current flowing in each of the windings.

93. The device of claim 83, wherein the charging circuit is configured to control the rate at which the rechargeable battery charges by controlling a rate of braking of the spindle motor.

94. The device of claim 83, wherein the charging circuit is configured to control a rate of braking of the spindle motor.

95. The device of claim 94, wherein the charging circuit is configured to control the rate of braking of the rotating spindle motor by controlling the rate at which the rechargeable battery charges.

96. A disk drive configured to be powered from a rechargeable bate, comprising:
   a disk;
   a spindle motor configured to rotate the disk, and
   a charging circuit coupled to the spindle motor and for coupling to the rechargeable battery, the charging circuit being configured to convert kinetic energy of the rotating spindle motor into electrical energy during braking of the spindle motor and to charge the rechargeable battery with the electrical energy, the charging circuit being further configured to control a rate at which the rechargeable battery charges.

97. The disk drive of claim 96, further including a regulating circuit configured to regulate the electrical energy and to charge the rechargeable battery using the regulated electrical energy.

98. The disk drive of claim 97, wherein the spindle motor, in operation, produces a three phase bemf and wherein the regulating circuit is configured to selectively rectify the generated three phase bemf and to control currant flowing from a first energy storing device coupled to the rectified bemf to a second energy storing device coupled to the rechargeable battery.

99. The disk drive of claim 98, wherein the regulating circuit is fitter configured to filter the selectively rectified three-phase bemf and to control current flowing from the fat energy device coupled to the rectified and filtered bemf to the second energy-storing device.

100. The disk drive of claim 98, wherein the first energy-storing device includes an inductor.

101. The disk drive of claim 98, wherein the second energy-storing device includes a capacitor.

102. The disk drive of claim 98, wherein the regulating circuit further includes:
   a nonlinear element between the first energy storing device and the second energy storage element, and
   control logic to selectively control a flow of current through the first energy storing device to a reference potential or to the second energy-storing dice.

103. The disk drive of claim 102, wherein the nonlinear element includes a p-n junction.

104. The disk drive of claim 102, wherein the control logic is configurable to selectively control a magnitude of the current flowing through the first energy storing device to control the rate at which the rechargeable battery charges and a rate of brig of the spindle motor.

105. The disk drive of claim 96, wherein the spindle motor includes windings and the charging circuit is configured to selectively and cyclically short and open circuit the windings during the braking step and to selectively charge a capacitor coupled to the rechargeable battery using current flowing in each of the windings.

106. The disk drive of claim 96, wherein the charging circuit is configured to control the rate at which the rechargeable battery charges by controlling a rate of braking of the spindle motor.

107. The disk drive of claim 96, wherein the charging circuit is configured to control a rate of braking of the spindle motor.

108. The disk drive of claim 107, wherein the charging circuit is configured to control the rate of braking of the rotating spindle motor by controlling the rate at which the rechargeable battery charges.

109. Method of operating a disk drive having a spindle motor that rotates a disk, comprising:

drawing electrical energy from a rechargeable battery to execute commands for reading or writing to the disk while the spindle motor is rotating;

selecting a rate at which to brake the rotating spindle motor and braking the rotating spindle motor at the selected braking rate;

converting kinetic energy of the rotating spindle motor into electrical energy during the braking step, and charging the rechargeable battery using the electrical energy.

110. The method of claim 109, further including regulating the electrical energy and using the regulated electrical energy to charge the rechargeable battery.

111. The method of claim 110, wherein the spindle motor, in operation, produces a three phase bemf and wherein the converting step includes:

selectively rectifying the generated three phase bemf and controlling current flowing from a first energy-storing device coupled to the rectified bemf to a second energy-storing device coupled to the rechargeable battery.

112. The method of clam 111, further including filtering the rectified three-phase bemf.

113. The method of claim 111, wherein the first energy-storing device includes an inductor.

114. The method of claim 111, wherein the second energy-storing device includes a capacitor.

115. The method of claim 111, wherein regulating step includes controlling a flow of current through the first energy storing device to a reference potential or to the second energy storing device through a nonlinear element between the first energy storing device and the second energy storing device.

116. The method of claim 111, wherein the controlling step includes selectively controlling a magnitude of the current flowing through the first energy storing device to control a charge rate of the rechargeable battery and the rate at which the spindle motor brakes.

117. The method of claim 109, wherein the spindle motor includes windings that are selectively and cyclically shorted and open circuited during the braking step and wherein the method further includes selectively charging a capacitor coupled to the rechargeable battery using current flowing in each of the windings.

118. The method of claim 117, wherein controlling the charging rate of the rechargeable battery is carried out by controlling the rate at which the spindle motor brakes in the banking step.

119. The method of claim 118, wherein controlling the rate at which the spindle motor brakes is carried out by controlling a rate of charging of the rechargeable battery.

120. The method of claim 109, wherein the charging step includes controlling a charging rate of the rechargeable battery.

121. A mobile host device, comprising:

a rechargeable battery;

a disk drive having a spindle motor that rotates a disk the disk drive drawing electrical energy from the rechargeable battery during operation while the spindle motor is rotating;

a charging circuit coupled to the spindle motor and to the rechargeable battery, the charging circuit being configured to convert kinetic energy of the rotating spindle motor into electrical energy during braking of the spindle motor, the charging circuit further being configured to control a rate at which the spindle motor brakes and to charge the rechargeable battery with the electrical energy.

122. The device of claim 121, further including a regulating circuit configured to regulate the electrical energy and to charge the rechargeable battery using the regulated electrical energy.

123. The device of claim 122, wherein the spindle motor, in operation, produces a three phase bemf and wherein the regulating circuit is configured to selectively rectify the generated three phase bemf and to control current flowing from a first energy storing device coupled to the rectified bemf to a second energy storing device coupled to the rechargeable battery.

124. The device of claim 123, wherein the regulating circuit is further configured to filter the selectively rectified three-phase bemf and to control current flowing from the first energy-storing device coupled to the rectified and filtered bemf to the second energy-storing device.

125. The device of claim 123, wherein the first energy-storing device includes an inductor.

126. The device of claim 123, wherein the second energy-storing device includes a capacitor.

127. The device of claim 123, wherein the regulating circuit includes:

a nonlinear element between the first energy storing device and the second energy storage element, and control logic to selectively control a flow of current through the first energy-storing device to a reference potential or to the second energy-storing device.

128. The device of claim 127, wherein the nonlinear element includes a p-n junction.

129. The device of claim 127, wherein the control logic is configurable to selectively control a magnitude of the current flowing through the first energy storing device to control a charge rate of the rechargeable battery and a rate of braking of the spindle motor.

130. The device of claim 121, wherein the spindle motor includes windings and the charging circuit is configured to selectively and cyclically short and open circuit the windings during the braking step and to selectively charge a capacitor coupled to the rechargeable battery using current flowing in each of the windings.

131. The device of claim 121, wherein the charging circuit is configured to control a charging rate of the rechargeable battery.

132. The device of claim 131, wherein the charging circuit is configured to control the charging rate of the rechargeable battery by controlling the rate at which the spindle motor brakes.

133. The device of claim 132, wherein the charging circuit is configured to control the rate at which the spindle motor bakes by controlling a rate of charging of the rechargeable battery.

134. A disk drive configured to be powered from a rechargeable battery comprising:

a disk;

a spindle motor configured to rotate the disk, and a charging circuit coupled to the spindle motor and for coupling to the rechargeable battery, the charging circuit being configured to convert kinetic energy of the rotating spindle motor into electrical energy dung brig of the spindle motor, the charging circuit ether being configured to control a rate at which the spindle motor brakes and to charge the rechargeable battery with the electrical energy.

135. The disk drive of claim 134, further including a regulating circuit configured to regulate the electrical energy and to charge the rechargeable battery using the regulated electrical energy.

136. The disk drive of claim 135, wherein the spindle motor, in operation, produces a three phase bemf and wherein the regulating circuit is configured to selectively rectify the generated three phase bemf and to control current flowing from a first energy storing device coupled to the rectified bemf to a second energy storing device coupled to the rechargeable battery.

137. The disk drive of claim 136, wherein the regulating circuit is further configured to filter the selectively rectified three-phase bemf and to control current flowing from the first energy device coupled to the rectified and filtered bemf to the second energy-storing device.

138. The disk drive of claim 136, wherein the first ne-storing device includes an inductor.

139. The disk drive of claim 136, wherein the second energy-storing device includes a capacitor.

140. The disk drive of claim 136, wherein the regulating circuit further includes:

a nonlinear element between the first energy storing device and the second energy storage element, and control logic to selectively control a flow of current through the first energy-storing device to a reference potential or to the second energy-storing device.

141. The disk drive of claim 140, wherein the nonlinear element includes a p-n junction.

142. The disk drive of claim 140, wherein the control logic is configurable to selectively control a magnitude of the current flowing through the first energy storing device to control a charge rate of the rechargeable battery an the rate at which the spindle motor brakes.

143. The disk drive of claim 134, wherein the spindle motor includes windings and the charging circuit is configured to selectively and cyclically short and open circuit the windings during the braking step and to selectively charge a capacitor coupled to the rechargeable battery using current flowing in each of the winding.

144. The disk drive of clam 134, wherein the charging circuit is configured to control a charging rate of the rechargeable battery.

145. The disk drive of claim 144, wherein the charging circuit is configured to control the charging rate of the rechargeable battery by controlling the rate at which the spindle motor brakes.

* * * * *